(12) United States Patent
Yoshida

(10) Patent No.: US 7,255,222 B2
(45) Date of Patent: Aug. 14, 2007

(54) UNLOADER

(75) Inventor: Yuji Yoshida, Toyama (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 11/472,930

(22) Filed: Jun. 22, 2006

(65) Prior Publication Data

US 2007/0003658 A1    Jan. 4, 2007

(30) Foreign Application Priority Data

Jun. 29, 2005    (JP) .......................... P2005-189175

(51) Int. Cl.
*B65G 15/20* (2006.01)

(52) U.S. Cl. ............... 198/626.1; 198/626.5; 198/604

(58) Field of Classification Search ............... 198/604, 198/606, 620, 626.1, 626.3, 626.5, 626.6
See application file for complete search history.

(56) References Cited

U.S. PATENT DOCUMENTS

| | | | | |
|---|---|---|---|---|
| 3,074,533 A | * | 1/1963 | Ninnemann et al. | 198/626.1 |
| 3,108,682 A | * | 10/1963 | Zipper | 198/626.1 |
| 3,869,038 A | * | 3/1975 | Piper et al. | 198/626.1 |
| 5,094,340 A | * | 3/1992 | Avakov | 198/626.1 |
| 5,441,146 A | * | 8/1995 | Ziegler | 198/867.11 |
| 6,644,467 B1 | * | 11/2003 | Chiuch | 198/626.1 |

FOREIGN PATENT DOCUMENTS

JP        5-301268        11/1993

* cited by examiner

*Primary Examiner*—James R. Bidwell
(74) *Attorney, Agent, or Firm*—Everest Intellectual Property Law Group; Michael S. Leonard

(57) ABSTRACT

An unloader that includes a pad replacing device provided adjacently to at least one of an upper carrying device and a lower carrying device. Each of the carrying devices includes an endless rotating member and plural unloader pads, the endless rotating member having a plurality of first pad attaching portions at intervals in a rotational direction, on which the unloader pads are detachably attached by sliding the unloader pads in a direction orthogonal to the rotational direction. The pad replacing device includes a pad setting portion and a pad moving portion, the pad setting portion having a second pad attaching portion on which a replacing pad is attached by sliding the replacing pad in the direction orthogonal to the rotational direction. The unloader pad is detached by being pushed by the replacing pad by moving the replacing pad to the unloader pad.

4 Claims, 11 Drawing Sheets

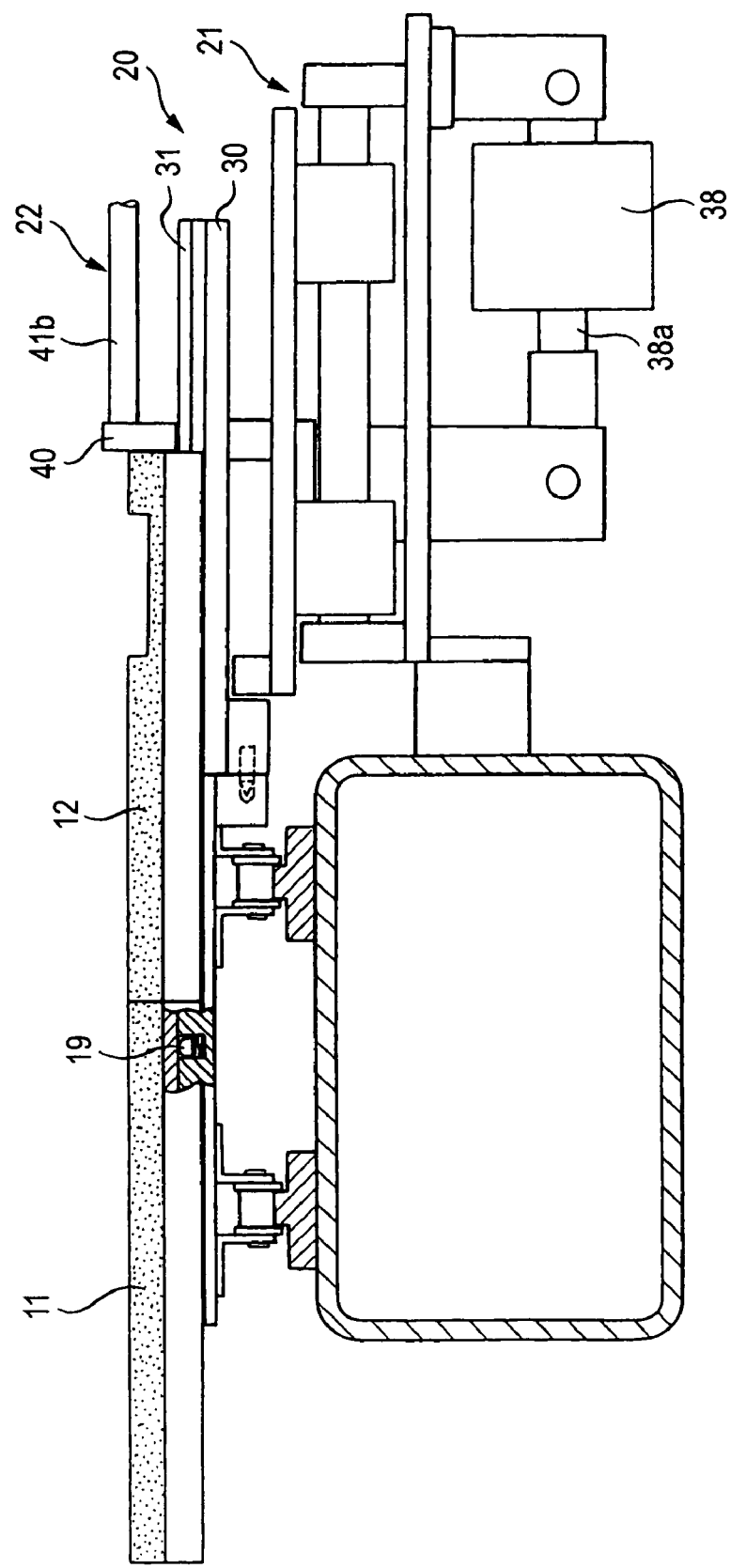

UNLOADER

BACKGROUND OF THE INVENTION

1. Field of the Invention

The present invention relates to an unloader for drawing in a molded product after the molded product is molded by extruding a material such as resin, metal, ceramic or the like by an extrusion device.

2. Description of the Related Art

There is known an unloader, as disclosed in JP-A-5-301268, for drawing in a molded product after the molded product is extruded by an extrusion device The unloader includes belt conveyors at an interval in an up and down direction. The belt conveyors rotates endless belts by rotating drive drums. A lower face of a molded product is brought into contact with the endless belt of the lower belt conveyor, an upper face of the molded product is brought into contact with the endless belt of the upper belt conveyor, and the molded product is carried by rotating the upper and lower endless belts.

SUMMARY OF THE INVENTION

According to the above-described unloader, the upper and lower belt conveyors constitute carrying devices. The surfaces of the endless belts constitute carry faces, which are brought into contact with the upper face and the lower face of the molded product. The shape of the carry face is a flat face.

When the upper and lower faces of the molded product are flat faces and do not have recesses and projections, the molded product can be carried without any problem. However, in a case where the molded product has recesses and projections at least on one of the upper and lower faces thereof, the molded product may not be carried.

In order to resolve the problem, it is conceivable to make the shapes of the carry faces of those upper and lower belt conveyors changeable. However, it is very difficult to change the shape of the carry face of the belt conveyor and is almost impossible in reality. Therefore, the molded product having recesses and projections on at least one of the upper face and the lower face cannot be carried.

It is an object of the invention to provide an unloader capable of simply changing a shape of a carry face of a carrying device.

According to a first aspect of the invention, there is provided an unloader for carrying a molded product, including: a lower carrying device having a carry face that is brought into contact with a lower face of the molded product; an upper carrying device having a carry face that is brought into contact with an upper face of the molded product; and a pad replacing device provided adjacently to at least one of the upper carrying device and the lower carrying device; wherein each of the carrying devices includes an endless rotating member and a plurality of unloader pads, the endless rotating member having a plurality of first pad attaching portions at intervals in a rotational direction, on which the unloader pads are detachably attached by sliding the unloader pads in a direction orthogonal to the rotational direction, the carry face being formed by surfaces of the unloader pads; wherein the pad replacing device includes a pad setting portion and a pad moving portion, the pad setting portion having a second pad attaching portion on which are placing pad is attached by sliding the replacing pad in the direction orthogonal to the rotational direction of the endless rotating member so as to opposed to the unloader pad; and wherein the unloader pad is detached by being pushed by the replacing pad by moving the replacing pad to the unloader pad on the endless rotating member by the pad moving portion, and the replacing pad 12 is attached to the first pad attaching portion.

According to a second aspect of the invention, the unloader further includes a positioning section for positioning the first pad attaching portion and the second pad attaching portion in the rotational direction of the endless rotating member.

According to a third aspect of the invention, the second pad attaching portion is movably provided on a set plate that is reciprocally moved to and from the endless rotating member; the second pad attaching portion and the first pad attaching portion are provided with a projected portion and a hole, respectively, for fitting to position the second pad attaching portion and the first pad attaching portion to each other; and the projected portion and the hole are fitted by moving the set plate to the endless rotating member.

According to a fourth aspect of the invention, the unloader further includes a pad recovery portion provided oppositely to the second pad setting portion in the direction orthogonal to the rotational direction of the endless rotating member; and the unloader pad detached from the first pad attaching portion is contained into the pad recovery portion.

According to the first aspect of the invention, the unloader pad can be detached from and the replacing pad can be attached to the endless rotating member by stopping the endless rotating member, making the unloader pad and the replacing pad located at the same position in the rotational direction of the endless rotating member, and moving the replacing pad by the pad moving portion.

Therefore, the shape of the carry face of the carrying device can simply be changed.

According to the second aspect of the invention, the first pad attaching portion of the endless rotating member and the second pad attaching portion of the pad setting portion are positioned by the positioning section. Therefore, the pad can be replaced by slidingly moving the replacing pad smoothly along the first and second pad attaching portions.

According to the third aspect of the invention, by fitting the positioning projected portion and the hole, the positioning can be carried out by moving the second pad attaching portion of the pad setting portion in accordance with a degree of the positional shift.

According to the fourth aspect of the invention, the unloader pad can be contained in the pad recovery portion.

BRIEF DESCRIPTION OF THE DRAWINGS

FIG. 10 is a front view schematically showing the pad replacing operation; and

DETAILED DESCRIPTION OF THE PREFFERED EMBODIMENTS

Figure 1:
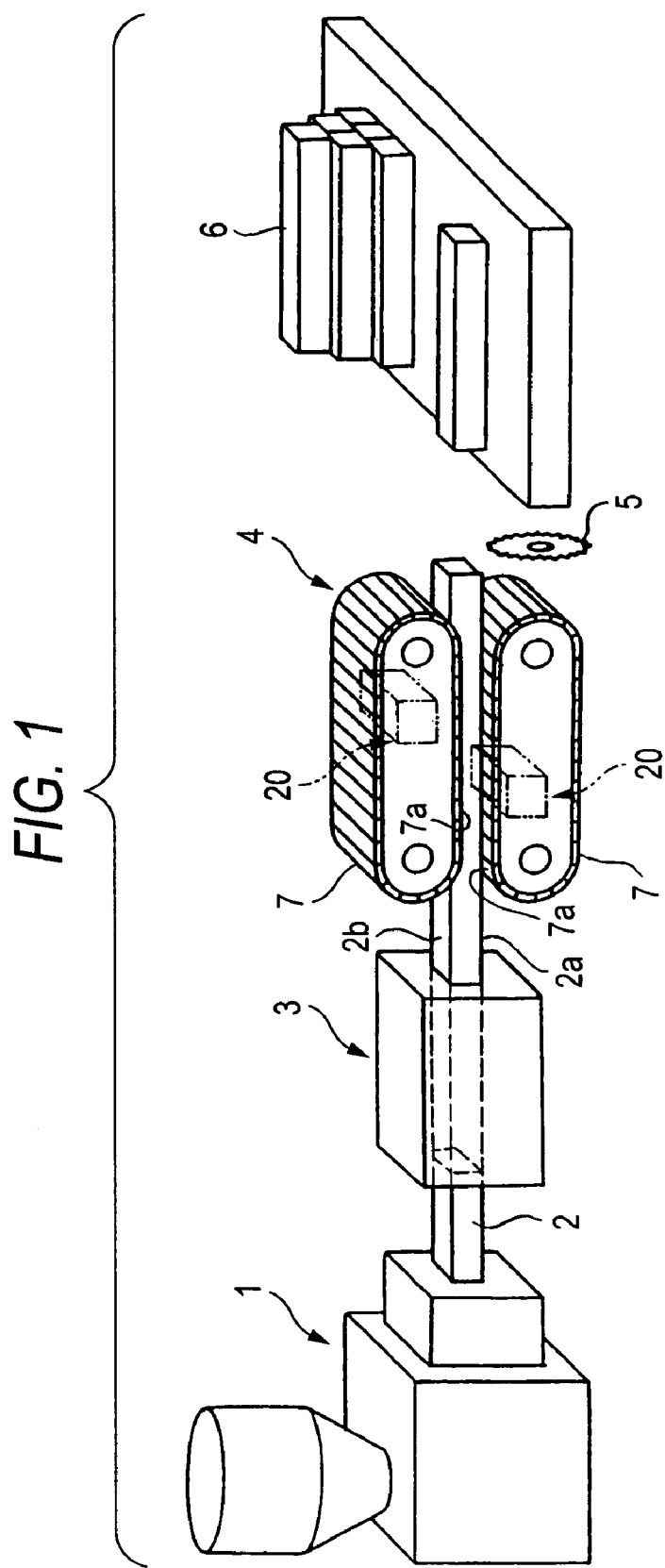
FIG. 1 is a perspective view showing a molded product extrusion system.

FIG. 1 is a perspective view showing a molded product extruding system. A molded product 2 extruded by an extrusion device 1 is cooled by a cooling device 3. Thereafter, the molded product 2 is carried by an unloader 4, and cut by a predetermined length by a cutter 5 to constitute a product 6.

The unloader 4 includes carrying devices 7 that are opposed to each other at an interval in an up and down direction. The molded product 2 is carried by bringing a carry face 7a of the lower carrying device 7 into contact with a lower face 2a of the molded product 2 and bringing a carry face 7a of the upper carrying device 7 into contact with an upper face 2b of the molded product 2.

As a material of the molded product 2, for example, resin, metal, ceramic and the like are exemplified. In the case of FIG. 1, the molded product 2 is formed of a resin material. The molded product 2 is extruded in a high temperature state. Thus, the molded product 2 is cooled by the cooling device 3 and thereafter carried by the unloader 4.

As described above, in a case in which the lower face 2a and the upper face 2b of the molded product 2 constitute flat faces without having recesses and projections, and the carry faces 7a of the carrying device 7 constitute flat faces, as shown in FIG. 1, the molded product 2 can be carried without any problem.

Figure 2A:
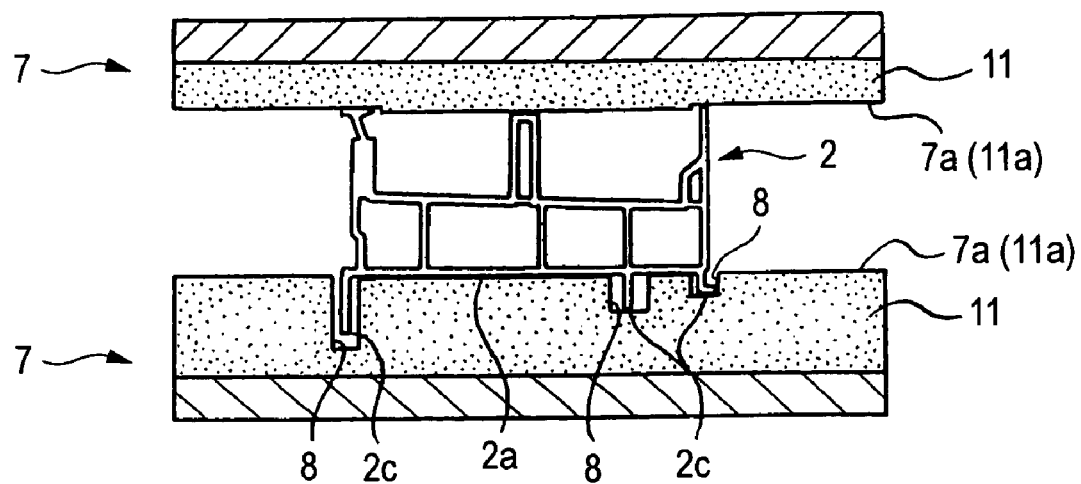
FIGS. 2A and 2B are sectional views showing shapes of upper and lower faces of a molded product and carry faces.
Figure 2B:
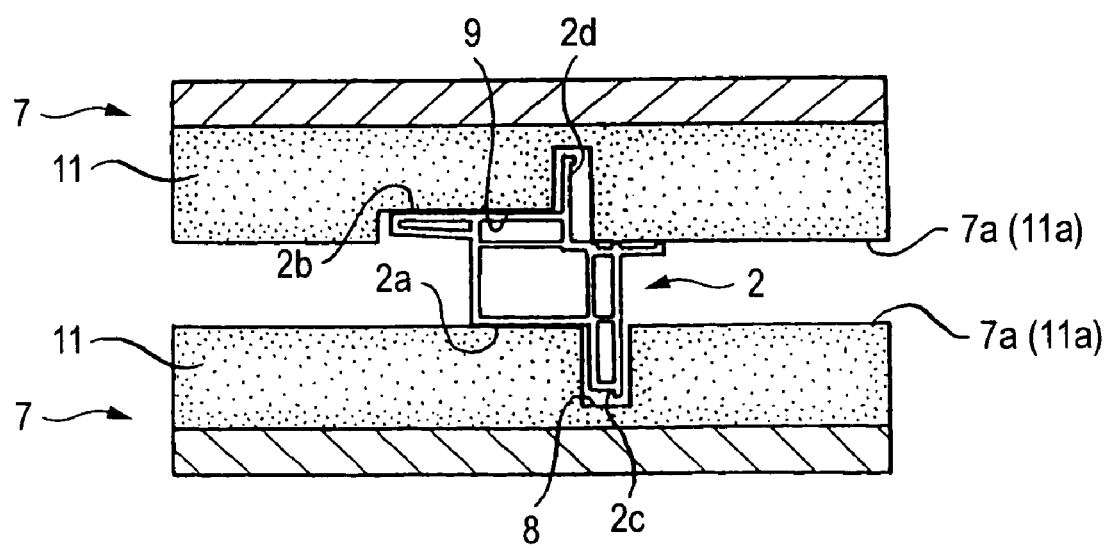

However, when the lower face 2a and/or the upper face 2b of the molded product 2 constitute shapes having recesses and projections as shown in FIGS. 2A and 2B, shapes of the carry faces 7a need to be, not flat, but in conformity with the recesses and projections.

For example, when the lower face 2a of the molded product 2 is provided with three projected portions 2c as shown in FIG. 2A, the carry face 7a of the lower carrying device 7 is formed in a shape having three recessed portions 8.

When the lower face 2a of the molded product 2 is provided with one projected portion 2c, the carry face 7a of the lower carrying device 7 is formed into a shape having one recessed portion 8, and when the upper face 2b of the molded product 2 is provided with a projected portion 2d in a hook-like shape, the carry face 7a of the upper carrying device 7 is formed into a shape having a recessed portion 9 in a hook-like shape.

Figure 3:
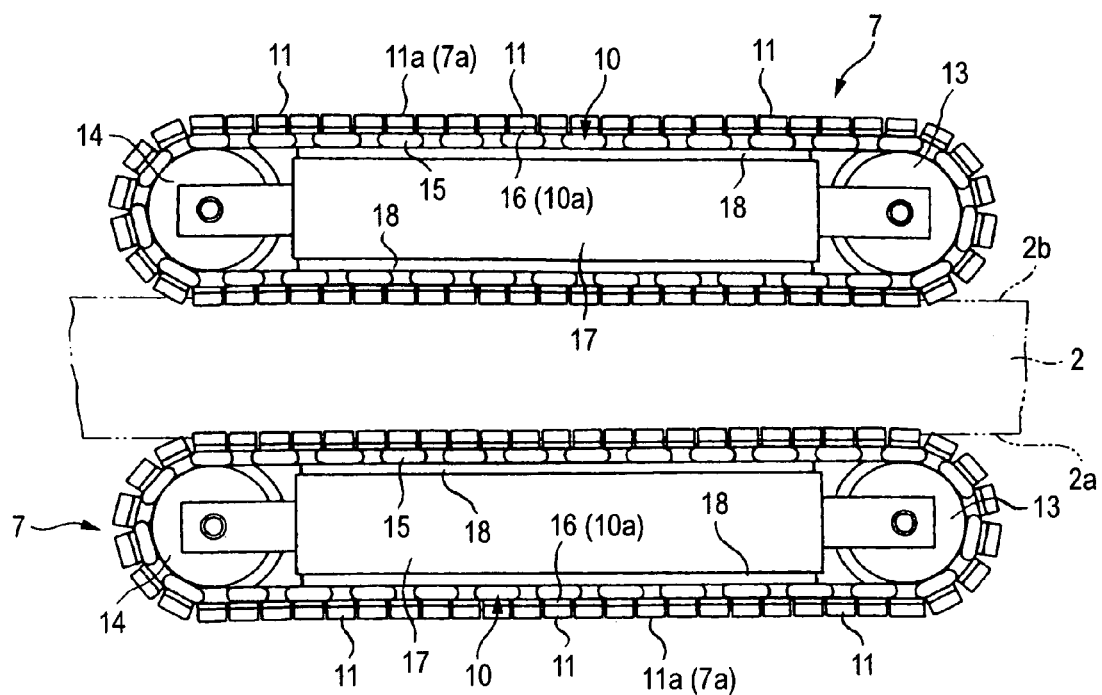
FIG. 3 is a side view showing a carrying member.

As shown in FIG. 3, the carrying device 7 is detachably attached with a number of unloader pads 11 at a surface of an endless rotating member 10 that is driven to rotate along a rotational direction. The carry face 7a is constituted by surfaces 11a of the number of unloader pads 11.

Thus, by replacing the unloader pad 11 with another unloader pad 11 the surface 11a shape of which differs from the first one, the shape of the carry face 7a can be simply changed.

For example, by attaching the unloader pads 11 having the recess portions 8, 9 as shown in FIGS. 2A and 2B, the shapes of the carry faces 7a are brought into conformity with the shapes of the lower face 2a and the upper face 2b of the molded product 2.

Now, an explanation will be given of an embodiment of replacing the unloader pad 11.

Figure 4:
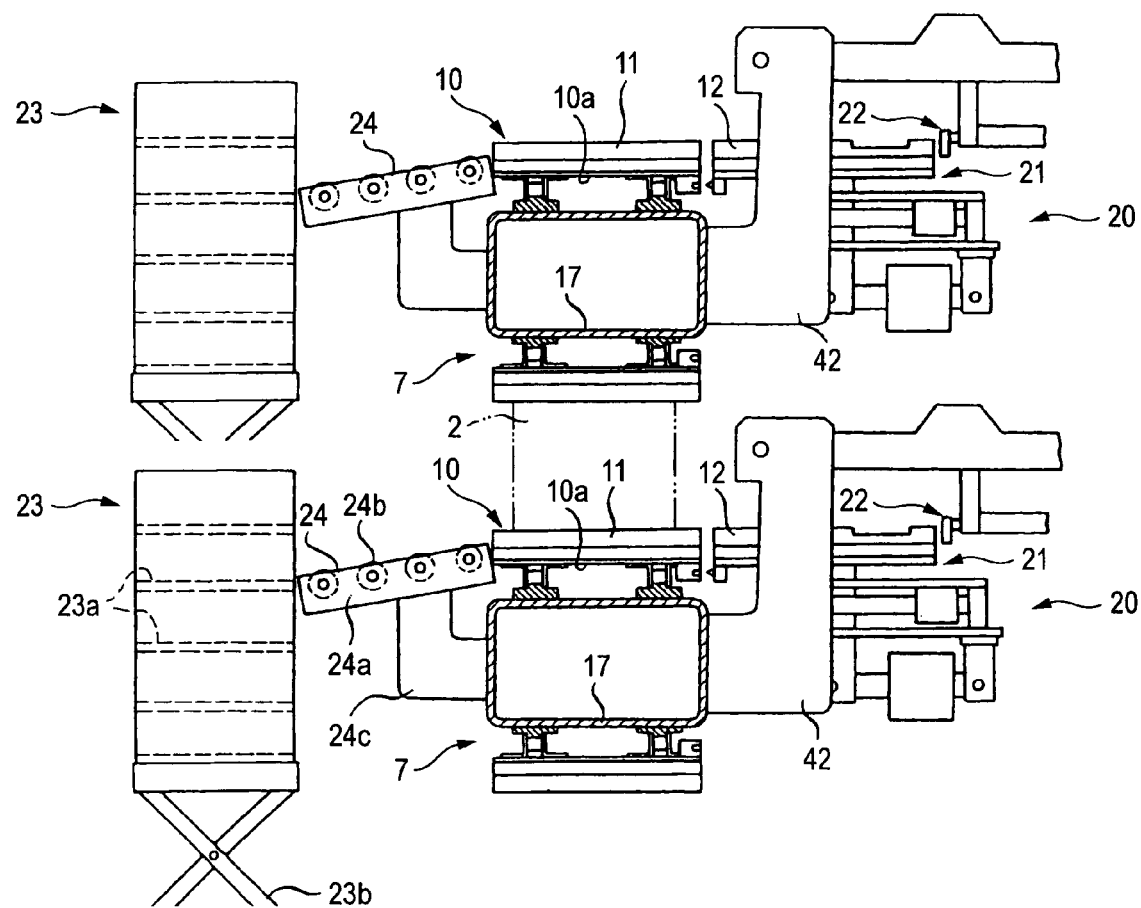
FIG. 4 is a sectional view showing an unloader having a pad replacing device and a pad recovery portion.

As shown in FIG. 3 and FIG. 4, the endless rotating member 10 is provided with the number of pad attaching portions 10a at intervals in the rotational direction. The respective pad attaching portions 10a are provided with the unloader pads 11. The unloader pads 11 are attached to and detached from the pad attaching portions 10a by sliding the unloader pads 11 in a direction orthogonal to the rotational direction.

As shown in FIG. 1, pad replacing devices 20 are respectively provided adjacently to the carrying devices 7.

As shown in FIG. 4, the pad replacing device 20 replaces the unloader pad 11.

Figure 5:
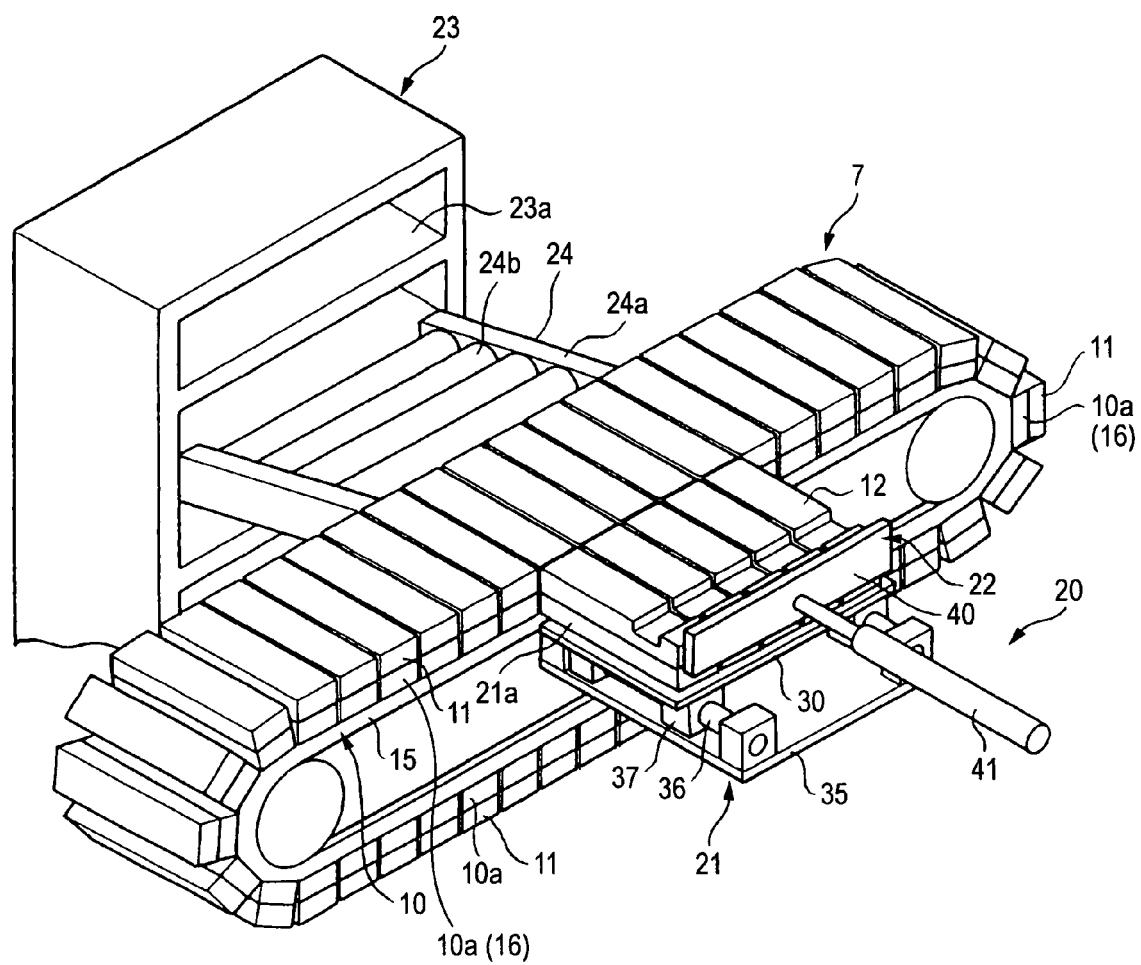
FIG. 5 is a perspective view showing a carrying device, the pad replacing device and the pad recovery portion.

As shown in FIG. 5, the pad replacing device 20 includes: a pad setting portion 21 provided on one side in the direction orthogonal to the rotational direction of the endless rotating member 10; replacing pads 12 detachably arranged on pad attaching portions 21a of the pad setting portion 21 by being slid in the direction orthogonal to the rotational direction; and a pad moving portion 22 for moving the replacing pads 12 toward the endless rotating member 10.

The replacing pads 12 are provided on the pad attaching portions 21a of the pad setting portion 21. The replacing pads 12 (pad attaching portions 21a) and the unloader pads 11 (pad attaching portions 10a) attached to the endless rotating member 10 are relatively positioned in the rotational direction. The replacing pads 12 are then moved by the pad moving portion 22. The unloader pads 11 are pushed by the replacing pads 12 and are successively slid relative to the pad attaching portions 10a of the endless rotating member 10. By successively sliding to move the replacing pads 12 toward the pad attaching portions 10a of the endless rotating member 10, the replacing pads 12 are attached to the pad attaching portions 10a of the endless rotating member 10 and the unloader pad 11s are detached.

Although the pads may be replaced one by one, it is preferable in view of an operational efficiency to simultaneously replace the plural pads.

Further, although an explanation has been given such that the pad replacing devices 20 are respectively provided adjacently to the lower and the upper carrying devices 7, the unloader pads 11 of the lower and the upper carrying devices 7 may be replaced by a single pad replacing device 20 by providing a lifting mechanism on the pad replacing device 20.

Furthermore, the pad replacing device 20 may be provided adjacently to either one of the lower and the upper carrying devices 7 and only the unloader pads 11 of either one of the lower and the upper carrying devices 7 may be replaced.

As shown in FIG. 5, a pad recovery portion 23 is provided on the other side in the direction orthogonal to the carrying direction of the endless rotating member 10. The pad recovery portion 23 is opposed to the pad setting portion 21.

The unloader pads 11 detached from the pad attaching portions 10a of the endless rotating member 10 are brought into the pad recovery portion 23 by being pushed by the replacing pads 12.

According to the embodiment shown in FIG. 5, a carry guide 24 is provided between the pad attaching portions 10a of the endless rotating member 10 and the pad recovery portion 23, and the unloader pads 11 pushed out from the pad attaching portions 10a are carried to the pad recovery portion 23 along the carry guide 24.

Thus, an interval between the endless rotating member 10 and the pad recovery portion 23 can be made wide, and the unloader pads 11 can be smoothly carried to the pad recovery portion 23 to be contained therein.

A specific shape of each member will now be described.

As shown in FIG. 3, the endless rotating member 10 includes: an endless chain 15 wound on a drive sprocket 13 and a driven sprocket 14; and a number of pad holders 16. The respective pad holders 16 are attached with the unloader pads 11 slidably in the direction orthogonal to the carrying direction. That is, the respective pad holders 16 are the pad attaching portions 10a.

Both end portions of each of the drive sprocket 13 and the driven sprocket 14 in a longitudinal direction thereof are rotatably attached to a frame 17. The upper face and the lower face of the frame 17 are respectively equipped with chain guides 18 and the endless chain 15 slidingly moves along the chain guides 18.

The frame 17 is attached to a base (not shown).

The endless rotating member 10 is not limited to the above-described constitution but may be constructed such that the pad holders are attached to the endless belt, or the pad holders are integrally provided on a strip-like member in an endless shape. Further, the pad holders may be connected to each other in an endless shape.

That is, as long as the endless rotating member 10 is provided with a number of the pad attaching portions at intervals in the rotational direction, the constitution of the endless rotating member 10 is not limited.

Figure 6:
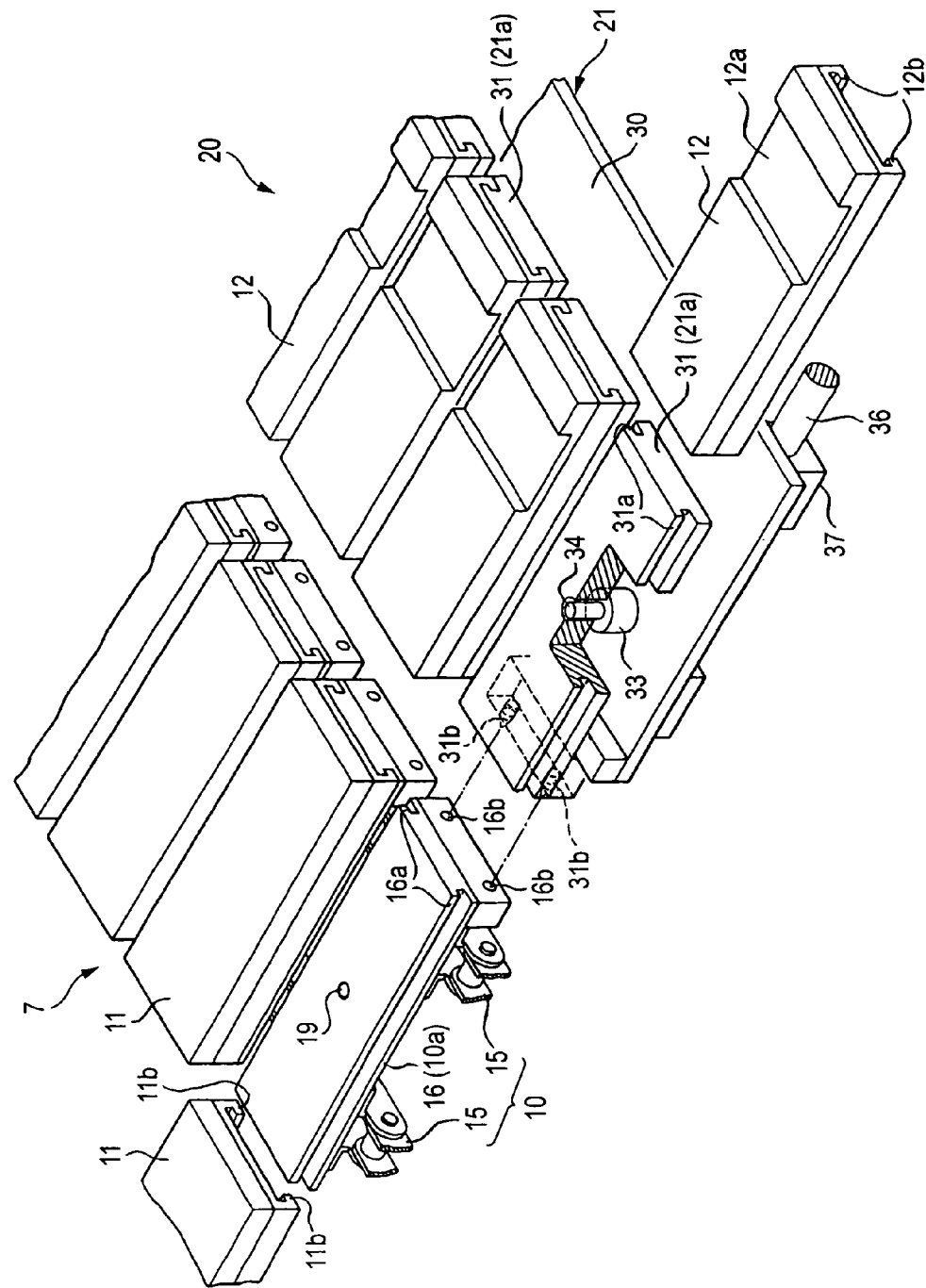
FIG. 6 is a perspective view schematically showing attachment of an unloader pad and a replacing pad.

As shown in FIG. 6, the pad holder 16 includes a guide portion 16a and a positioning hole 16b.

The guide portion 16a is continuous in the direction orthogonal to the rotational direction. For example, the guide portion 16a is constituted by continuously providing guide rails in the direction orthogonal to the rotational direction on both end faces in the carrying direction.

A plurality of the positioning holes 16b are provided at intervals in the carrying direction and the positioning hole 16b are opposed to the pad setting portion 21.

As shown in FIG. 6, the unloader pad 11 includes a guide receive portion 11b slidably fitted on the guide portion 16a. For example, the guide receive portion 11b is constituted by respectively providing hook pieces at both end portions in the carrying direction of a lower face of the unloader pad 11 and the hook pieces are slidably fitted on the guide rails.

Figure 7:
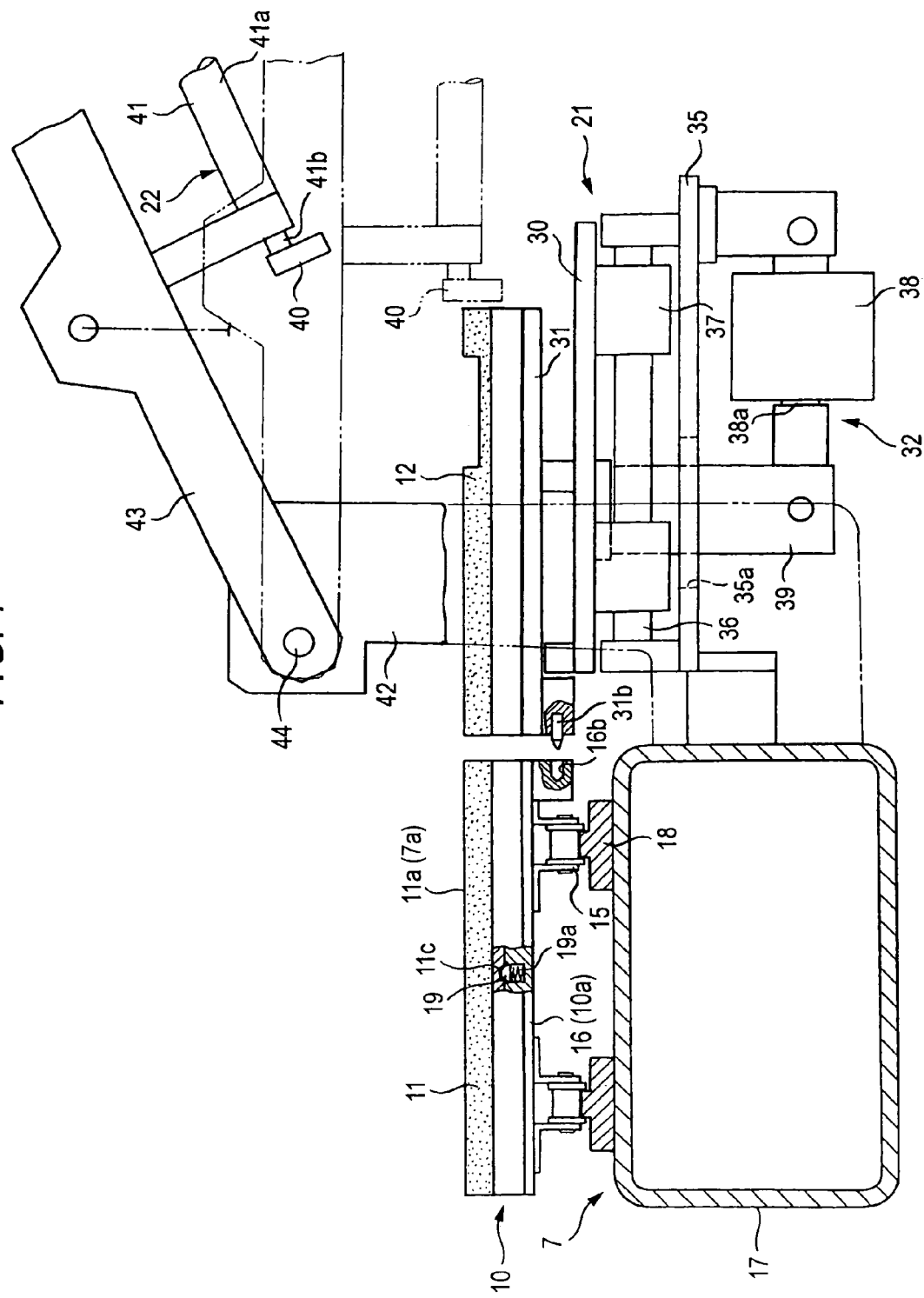
FIG. 7 is a front view schematically showing the pad replacing device.

As shown in FIG. 7, the pad holder 16 is provided with a lock member 19. The lock member 19 is projected from a surface of the pad holder 16 while being pushed upward by an elastic member 19a, and the lock member 19 is fitted in a recessed portion 11c formed on a lower face of the unloader pad 11 to hold the unloader pad 11.

As shown in FIG. 6, FIG. 7, the pad setting portion 21 includes: a set plate 30; pad holders 31 provided on the set plate 30; and a moving device 32 that reciprocally moves the set plate 30 to and from the endless rotating member 10.

The pad holder 31 includes a guide portion 31a continuous in the direction orthogonal to the moving direction. The pad holder 31 is the pad attaching portion 21a.

The pad holder 31 is provided with a positioning projected portion 31b, for example, a pin.

The positioning projected portion 31b is constituted by a shape fitted to the positioning hole 16b of the pad holder 16. The pad holder 16 and the pad holder 31 are positioned by fitting the positioning projected portion 31b to the positioning hole 16b, and the both guide portions 16a, 31a are made to be continuous. The pad holder 16 and the pad holder 31 have the same sectional shape.

The pad holder 31 is attached to the set plate 30 to be able to move in an arbitrary direction in a predetermined range.

For example, a rod member 33 fixed to the set plate 30 is inserted into a hole 34, and a gap is produced therebetween by making a diameter of the hole 34 larger than a diameter of the rod member 33. Thereby, the pad holder 31 is movable in the arbitrary direction relative to the set plate 30 by an amount of the gap. Further, the similar effect can be achieved by forming the rod member 33 by an elastically deformed synthetic resin. In this case, the gap is not necessarily required.

Although the plural pad holders 31 are provided on the set plate 30, the set plate 30 may be provided with only one pad holder 31.

The replacing pad 12 includes a guide receive portion 12b slidably fitted to the guide portion 31a of the pad holder 31. For example, hook pieces are respectively provided at both end portions in the carrying direction of a lower face of the replacing pad 12 to constitute the guide receive portion 12b and the hook pieces are slidably fitted to the guide portion 31a (guide rails).

A surface 12a of the replacing pad 12 differs from that of the unloader pad 11, whereas a rear face thereof is the same as that of the unloader pad 11. The replacing pad 12 is slidingly moved over to the pad holder 31 of the pad setting portion 21 and the pad holder 16 of the endless rotating member 10.

When the replacing pad 12 is provided on the pad holder 16 of the endless rotating member 10, the replacing pad 12 becomes the unloader pad 11, and when the unloader pad 11 is set on the pad setting portion 21, the unloader pad 11 becomes the replacing pad 12.

The moving device 32 includes a plate 35 fixedly attached to the frame 17 of the carrying device 7. Plural guide rods 36 are attached to the plate 35.

The guide rod 36 is slidably provided with a slider 37, and the slider 37 is fixedly attached to the lower face of the set plate 30.

Thus, the set plate 30 and the pad holder 31 attached to the set plate 30 can be moved reciprocally to and from the carrying device 7.

The plate 35 is equipped with a pressing cylinder 38. A movable member 39 connected to a piston rod 38a of the pressing cylinder 38 is fixedly attached to the rear face of the set plate 30 while passing an opening portion 35a formed in the plate 35.

Thereby, the set plate 30 and the pad holder 31 attached to the set plate 30 are reciprocally moved to and from the carrying device 7 by protruding and retracting the piston rod 38a of the pressing cylinder 38.

As shown in FIG. 5, the pad moving portion 22 includes a push member 40 for pushing the replacing pad 12, and an inserting cylinder 41 reciprocally moving the pushing member 40.

By moving the pushing member 40 via the inserting cylinder 41, the pushing member 40 interferes with the replacing pad 12 to move the replacing pad 12 toward the carrying device 7 by the pushing member 40.

In the embodiment, the pushing member 40 and the inserting cylinder 41 are made to be movable over to an operating position opposed to the replacing pad 12 and an retracted position separated from the replacing pad 12.

For example, as, shown in FIG. 7, a bracket 42 is fixedly attached to the frame 17 of the carrying device 7. The bracket 42 is fixed to the frame 17 such that the bracket 42 does not interfere with the pad setting portion 21.

A frame 43 is pivotably attached to the bracket 42 via a pin 44. The frame pivots in the up and down direction. The frame 43 is equipped with a cylinder tube 41a of the inserting cylinder 41.

The pushing member 40 is attached to a piston rod 41b of the inserting cylinder 41.

When pivoting the frame 43 to a lower position indicated by an imaginary line, the pushing member 40 is disposed at the operating position and the replacing pad 12 can be moved by the pushing member 40.

When pivoting the frame 43 to an upper position indicated by a bold line, the pushing member 40 and the inserting cylinder 41 are disposed at the retracted position. At this occasion, the replacing pad 12 is set to the pad holder 31 of the set plate 30, and the pushing member 40 and the inserting cylinder 41 do not constitute a hindrance.

As shown in FIG. 4, the pad recovery portion 23 includes a plurality of containing portions 23a at intervals in the up and down direction. By moving the pad recovery portion 23 by a lifting mechanism 23b, the unloader pad 11 is contained to any one of the containing portions 23a.

The carrying guide 24 has plural rollers 24b attached to a frame 24a. The frame 24a is attached to the frame 17 by a bracket 24c.

Now, the operation of replacing the pad will be described.

The endless rotating member 10 is stopped and the unloader pad 11 is disposed at a position the same as that of the replacing pad 12 in the rotational direction.

As shown in FIG. 7, in a state of pivoting the inserting cylinder 41 to the upper side, the plurality of pad holders 31 of the pad setting portion 21 are respectively set with the replacing pads 12 having a surface shape in correspondence with a successive extrusion molded product. Thereafter, the inserting cylinder 41 is pivoted to the lower side to be aligned with the position of the imaginary line.

Figure 8:
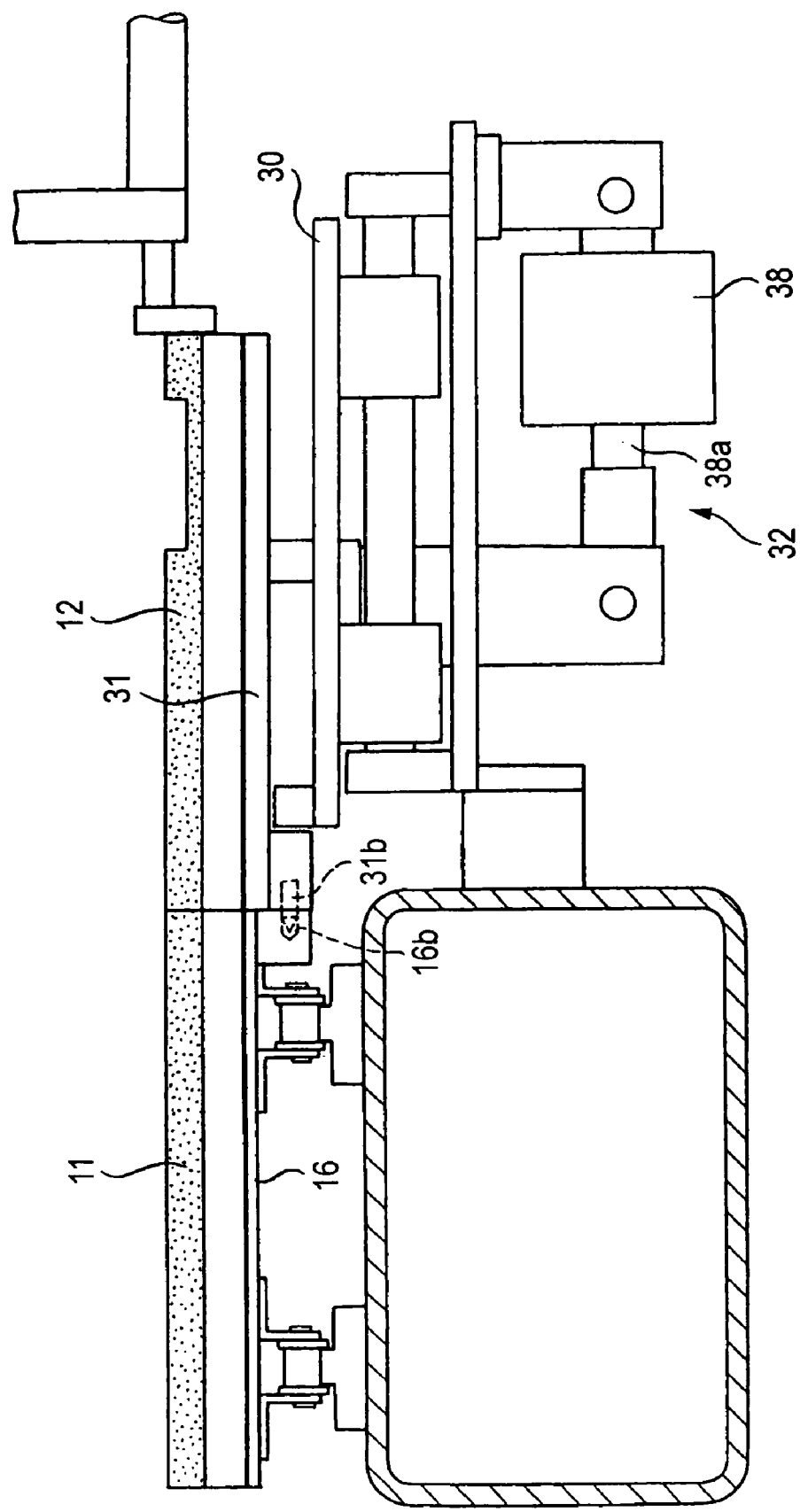
FIG. 8 is a front view showing a pad replacing operation.

As shown in FIG. 8, the set plate 30 is moved by protruding the piston rod 38a of the pressing cylinder 38 of the moving device 32, the positioning projected portion 31b of the pad holder 31 is fitted to the positioning hole 16b of the pad holder 16 to thereby position the pad holder 31 and the pad holder 16 in the rotational direction.

Figure 9A:
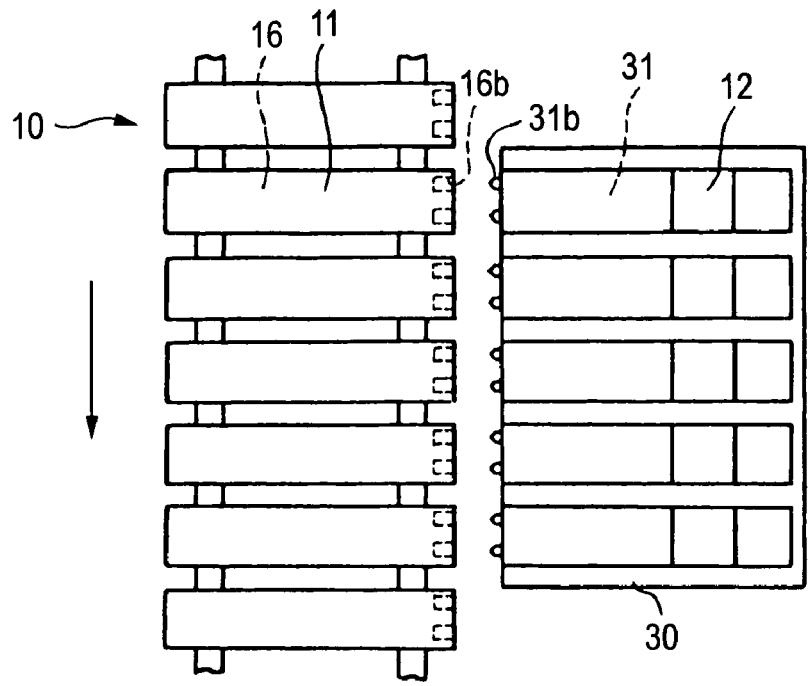
FIGS. 9A and 9B are plane views showing the pad replacing operation.

That is, as shown in FIG. 9A, when the endless rotating member 10 is stopped as described above, there is a case in which a position of the pad holder 16 on one side is sifted from the pad holder 31 on the other side in the rotational direction.

For example, by the deterioration of the endless chain 15, the interval of the pad holder 16 attached to the endless chain 15 becomes irregular, and the position of the pad holder 16 is shifted from the pad holder 31 in the rotational direction. Further, the position is shifted by an error in stopping the endless rotating member.

Figure 9B:
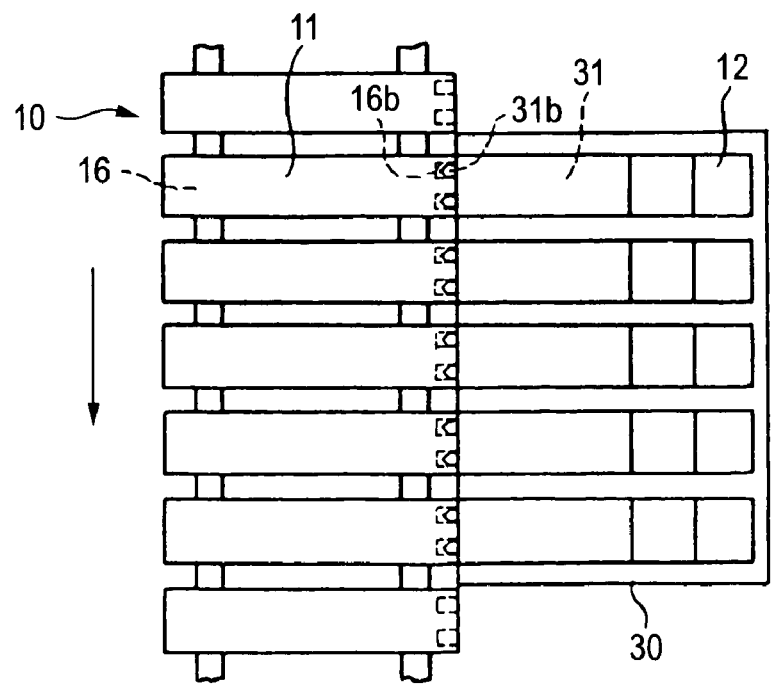

In the case of shifting the position in this way, when the positioning projected portion 31b and the positioning hole 16b are fitted to each other as described above, the pad holder 31 is moved in a direction reverse to the positional shift relative to the set plate 30, and by fitting the projected portion 31b and the hole 16b, as shown in FIG. 9B, the pad holder 19 and the pad holder 31 are positioned in the rotational direction. The positioning projected portion 31b is formed in a converging taper shape. Therefore, even when there is the positional shift as described above, a tip end portion of the positional projected portion 31b is brought into the positioning hole 16b and the positioning is carried out by fitting the both members.

Further, even when the interval of the pad holder 16 attached to the endless chain 15 becomes irregular by the deterioration of the endless chain 15, since each of the pad holders 31 are loosely fitted to the set plate 30 to be able to be movable in the up and down direction and in the left and right direction independently from each other. Thus, the positioning can be carried out by each of the pad holders 31.

Thereafter, the push member 40 is moved by protruding the piston rod 41b of the inserting cylinder 41 of the pad moving portion 22. The replacing pad 12 is then moved along the longitudinal direction of the pad holder 31, and as shown in FIG. 10, the replacing pad 12 is fitted to the pad holder 16 while pushing the unloader pad 11 to be moved along the pad holder 16. At this occasion, the lock member 19 of the pad holder 16 is temporarily detached from the recess portion 11c of the unloader pad 11 to be brought into contact with the lower face and thereafter, sprung back to a recess portion (not shown) of the replacing pad 12 moved to be mounted thereon, and the replacing pad 12 is fixed to the pad holder 16.

Figure 11:
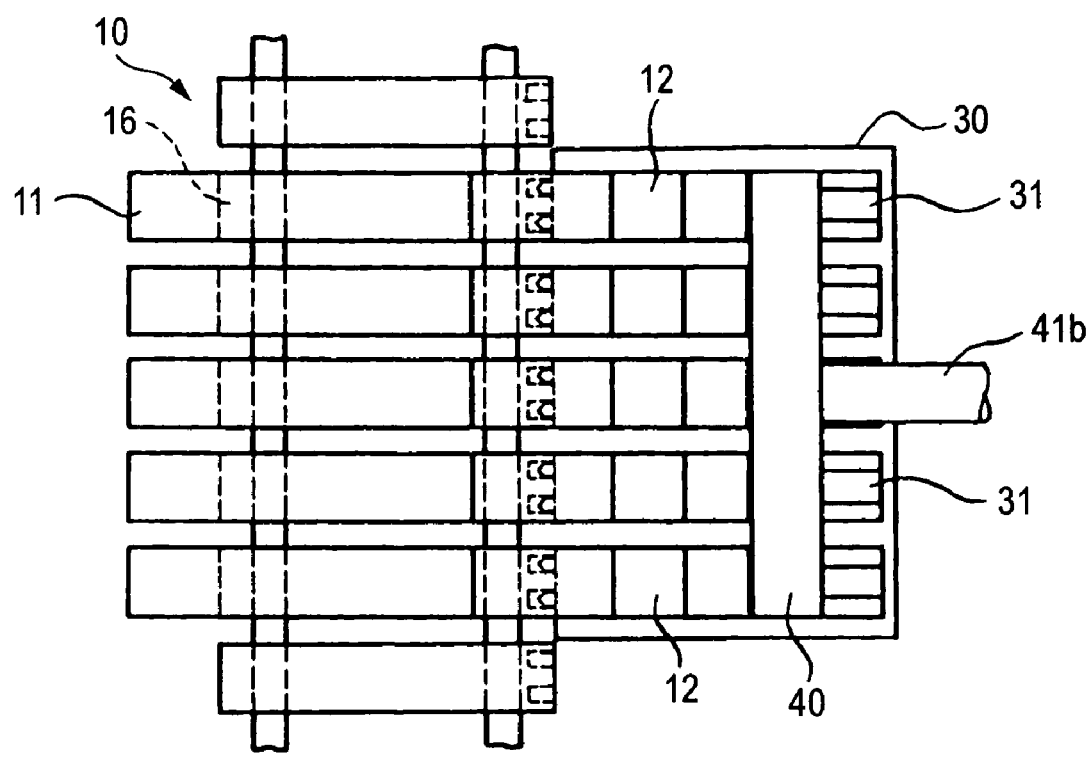
FIG. 11 is a plane view schematically showing the pad replacing operation.

The push member 40 is long and can simultaneously fit the plural replacing pads 12 to the pad holder 16 as shown in FIG. 11.

When the replacing pad 12 is mounted on the pad holder 16 as described above, the unloader pad 11 is pushed by the replacing pad 12 and is contained in the containing portion 23a of the pad recovery portion 23 through the carrying guide 24.

Thereafter, the piston rod 41b of the inserting cylinder 41 is operated to be retracted to return the push member 40 to an original position. The set plate 30 is moved to an original position to draw out the positioning projected portion 31b from the positioning hole 16b, and the endless rotating member 10 and the pad replacing device 20 are separated to enable to rotate the endless rotating member 10.

Further, the inserting cylinder 41 is pivoted to the upper side, the endless rotating member 10 is rotated, and the unloader pad 11 of the endless rotating member 10 is made to be able to be replaced by the replacing pad 12 by repeating a series of operation.

What is claimed is:

1. An unloader for carrying a molded product, comprising:
   a lower carrying device having a carry face that is brought into contact with a lower face of the molded product;
   an upper carrying device having a carry face that is brought into contact with an upper face of the molded product; and
   a pad replacing device provided adjacently to at least one of the upper carrying device and the lower carrying device;
   wherein each of the carrying devices includes an endless rotating member and a plurality of unloader pads, the endless rotating member having a plurality of first pad attaching portions at intervals in a rotational direction, on which the unloader pads are detachably attached by sliding the unloader pads in a direction orthogonal to the rotational direction, the carry face being formed by surfaces of the unloader pads;
   wherein the pad replacing device includes a pad setting portion and a pad moving portion, the pad setting portion having a second pad attaching portion on which a replacing pad is attached by sliding the replacing pad in the direction orthogonal to the rotational direction of the endless rotating member so as to opposed to the unloader pad; and
   wherein the unloader pad is detached by being pushed by the replacing pad by moving the replacing pad to the unloader pad on the endless rotating member by the pad moving portion, and the replacing pad 12 is attached to the first pad attaching portion.

2. The unloader according to claim 1, further comprising a positioning section for positioning the first pad attaching portion and the second pad attaching portion in the rotational direction of the endless rotating member.

3. The unloader according to claim 2, wherein the second pad attaching portion is movably provided on a set plate that is reciprocally moved to and from the endless rotating member;
   wherein the second pad attaching portion and the first pad attaching portion are provided with a projected portion and a hole, respectively, for fitting to position the second pad attaching portion and the first pad attaching portion to each other; and wherein the projected portion and the hole are fitted by moving the set plate to the endless rotating member.

4. The unloader according to claim 1, further comprising a pad recovery portion provided oppositely to the second pad setting portion in the direction orthogonal to the rotational direction of the endless rotating member; and wherein the unloader pad detached from the first pad attaching portion is contained into the pad recovery portion.

* * * * *